US012117722B2

(12) United States Patent
Minamisawa et al.

(10) Patent No.: US 12,117,722 B2
(45) Date of Patent: Oct. 15, 2024

(54) DRIVE DEVICE AND OPTICAL UNIT

(71) Applicant: NIDEC SANKYO CORPORATION, Nagano (JP)

(72) Inventors: Shinji Minamisawa, Nagano (JP); Takeshi Sue, Nagano (JP); Masato Gomyo, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 790 days.

(21) Appl. No.: 17/265,511

(22) PCT Filed: Jul. 5, 2019

(86) PCT No.: PCT/JP2019/026756
§ 371 (c)(1),
(2) Date: Feb. 2, 2021

(87) PCT Pub. No.: WO2020/031577
PCT Pub. Date: Feb. 13, 2020

(65) Prior Publication Data
US 2021/0223661 A1    Jul. 22, 2021

(30) Foreign Application Priority Data
Aug. 9, 2018  (JP) .................................. 2018-150630

(51) Int. Cl.
*G03B 5/02*     (2021.01)
*G02B 7/04*     (2021.01)
*G03B 5/04*     (2021.01)

(52) U.S. Cl.
CPC ................ *G03B 5/02* (2013.01); *G02B 7/04* (2013.01); *G03B 5/04* (2013.01); *G03B 2205/0069* (2013.01)

(58) Field of Classification Search
CPC .... G03B 5/02; G03B 5/04; G03B 2205/0069; G03B 2205/0023; G03B 30/00;
(Continued)

(56) References Cited

U.S. PATENT DOCUMENTS 8,780,264 B2   7/2014  Inata et al.
9,720,252 B2   8/2017  Asakawa et al.
(Continued)

FOREIGN PATENT DOCUMENTS

| CN | 1578333 | 2/2005 |
| CN | 102447822 | 5/2012 |

(Continued)

OTHER PUBLICATIONS

"International Search Report (Form PCT/ISA/210)" of PCT/JP2019/026756, mailed on Sep. 24, 2019, with English translation thereof, pp. 1-4.

*Primary Examiner* — Wyatt A Stoffa
*Assistant Examiner* — Ray Alexander Dean
(74) *Attorney, Agent, or Firm* — JCIPRNET

(57) ABSTRACT

A drive device is provided and includes: a movable body including an attachment part, to which an optical module is attached; a fixed body; and a support part rotatably supporting the movable body about an optical axis of the optical module attached to the attachment part with respect to the fixed body. The movable body includes a movable body-side fixing part, to which a flexible printed circuit pulled out of the optical module is fixed. The fixed body includes a fixed body-side fixing part, to which the flexible printed circuit is fixed. And, a portion between the movable body-side fixing part and the fixed body-side fixing part in a region along an outer periphery of the fixed body is set as a region drawn around in an attitude causing a thickness direction of the flexible printed circuit to be directions both orthogonal to a direction of the optical axis.

18 Claims, 11 Drawing Sheets

(58) Field of Classification Search
CPC ........ G02B 7/04; G02B 27/646; G02B 7/021;
H04N 23/00; H04N 23/60
See application file for complete search history.

(56) References Cited

U.S. PATENT DOCUMENTS

| | | | |
|---|---|---|---|
| 10,110,816 B2 | 10/2018 | Asakawa | |
| 2013/0128360 A1* | 5/2013 | Minamisawa | ......... G02B 27/64 |
| | | | 359/554 |

FOREIGN PATENT DOCUMENTS

| | | | |
|---|---|---|---|
| CN | 105824165 | | 8/2016 |
| JP | 2002344784 | | 11/2002 |
| JP | 2007197528 | | 8/2007 |
| JP | 2013251499 | | 12/2013 |
| JP | 2015082072 | | 4/2015 |
| JP | 2015082072 A | * | 4/2015 |
| JP | 2016126138 | | 7/2016 |
| JP | 2016126138 A | * | 7/2016 |
| JP | 2017215550 | | 12/2017 |
| JP | 2018077395 | | 5/2018 |
| WO | 2012004994 | | 1/2012 |
| WO | WO-2012004994 A1 | * | 1/2012 |

* cited by examiner

DRIVE DEVICE AND OPTICAL UNIT

CROSS-REFERENCE TO RELATED APPLICATION

This application is a 371 application of the international PCT application serial no. PCT/JP2019/026756, filed on Jul. 5, 2019, which claims the priority benefits of Japan application no. 2018-150630 filed on Aug. 9, 2018. The entirety of each of the above-mentioned patent applications is hereby incorporated by reference herein and made a part of this specification.

TECHNICAL FIELD

The present invention relates to an optical unit having a shake correcting function that is to be installed in a cellular phone with camera, and the like, and to a drive device for such an optical unit.

BACKGROUND ART

As an optical unit having a shake correcting function of the above type, devices described in Patent Literatures 1 through 3 are mentioned. Such optical units have a function of correcting rolling (shake around the optical axis).

An optical unit includes a movable body including an attachment part, to which an optical module is attached, a fixed body, and a support part to support the movable body on the fixed body rotatably about the optical axis of the optical module in the state of being attached to the attachment part. A flexible printed circuit is pulled out of the optical module, and the flexible printed circuit is equipped with a rotation permitting structure that allows the rotation about the optical axis of the optical module. The rotation permitting structure is formed by making the flexible printed circuit swirly or helical and arranged on the inside (optical axis center side) of the fixed body.

CITATION LIST

Patent Literature

[Patent Literature 1] WO 2012/004994
[Patent Literature 2] JP 2002-344784 A
[Patent Literature 3] JP 2015-82072 A

SUMMARY

Technical Problems

In any of the devices described in Patent Literatures 1 through 3, no account is taken of the assembly, in which the movable body is rotatably fitted on the fixed body and, on the movable body as such, an optical module provided with a flexible printed circuit is post-fitted. Specifically, the rotation permitting structure, which is formed by making the flexible printed circuit swirly or helical, is equipped and the rotation permitting structure is arranged on the inside (optical axis center side) of the fixed body, which leads to a configuration unsuitable for the assembly, in which an optical module is post-fitted on the movable body.

In addition, if an optical unit is to be reduced in height dimension in the optical axis direction (for downsizing), such reduction is not readily possible with the conventional structure as above.

An object of the present invention is to allow an easy performance of the assembly, in which the movable body is rotatably fitted on the fixed body and, on the movable body as such, an optical module provided with a flexible printed circuit is post-fitted.

Solutions to Problems

In order to solve the problem as above, a drive device according to the present invention includes: a movable body including an attachment part, to which an optical module is attached; a fixed body; and a support part configured to rotatably support the movable body about an optical axis of the optical module in a state of being attached to the attachment part with respect to the fixed body. The movable body includes a movable body-side fixing part, to which a flexible printed circuit pulled out of the optical module is fixed. The fixed body includes a fixed body-side fixing part, to which the flexible printed circuit is fixed. And, a portion between the movable body-side fixing part and the fixed body-side fixing part in a region along an outer periphery of the fixed body is a region drawn around in an attitude causing a thickness direction of the flexible printed circuit to be a direction orthogonal to a direction of the optical axis.

An "orthogonalizing attitude" may be any attitude as long as a plane intersecting the thickness direction of the flexible printed circuit faces an outer peripheral face of a fixing part, that is to say, the orthogonalizing attitude is not limited to an attitude causing the thickness direction of the flexible printed circuit to be strictly orthogonal to the direction of the optical axis, but includes an attitude resulting in an oblique facing.

According to the mode as above, the movable body includes a movable body-side fixing part, to which a flexible printed circuit pulled out of the optical module is fixed. The fixed body includes a fixed body-side fixing part, to which the flexible printed circuit is fixed. In addition, a portion between the movable body-side fixing part and the fixed body-side fixing part in a region along an outer periphery of the fixed body is a region drawn around in an attitude causing a thickness direction of the flexible printed circuit to be a direction orthogonal to a direction of the optical axis.

It is thus possible to use the "region drawn around" as a portion between the movable body-side fixing part and the fixed body-side fixing part in a region along an outer periphery of the fixed body to arrange the rotation permitting structure of the flexible printed circuit, which structure allows the rotation about the optical axis of the optical module.

Consequently, the assembly, in which the movable body is rotatably fitted on the fixed body and, on the movable body as such, an optical module provided with a flexible printed circuit is post-fitted, is easily performed.

In the state of being assembled into an optical unit, if the optical unit is to be reduced in height dimension in the optical axis direction (for downsizing), such reduction is readily possible.

In the drive device according to the present invention, the fixed body-side fixing part more protrudes outward in a radial direction than a side, at which the fixed body-side fixing part is formed.

According to this mode, an outward protruding structure makes it possible to easily form a gap or the like allowing a swing of the flexible printed circuit that employs the position of the fixed body-side fixing part as a fulcrum and is attendant on the rotation of the movable body about the optical axis, which makes the rotation permitting structure of the flexible printed circuit easy to attain with a simple structure.

In the drive device according to the present invention, a fixing face direction of the movable body-side fixing part is different from a fixing face direction of the fixed body-side fixing part.

According to this mode, the structure, in which a fixing face direction of the movable body-side fixing part is different from a fixing face direction of the fixed body-side fixing part, makes the rotation permitting structure of the flexible printed circuit easy to attain with a simple structure.

In order to solve the problem as above, an optical unit according to the present invention includes: a movable body including an optical module; a fixed body; and a support part configured to rotatably support the movable body about an optical axis of the optical module with respect to the fixed body. The movable body includes a movable body-side fixing part, to which a flexible printed circuit pulled out of the optical module is fixed. The fixed body includes a fixed body-side fixing part, to which the flexible printed circuit is fixed. The flexible printed circuit is drawn around with a portion between the movable body-side fixing part and the fixed body-side fixing part in a region along an outer periphery of the fixed body. And, the portion of the flexible printed circuit between the movable body-side fixing part and the fixed body-side fixing part has a structure permitting the movable body to rotate about the optical axis.

According to this mode, the "region drawn around" as a portion between the movable body-side fixing part and the fixed body-side fixing part in a region along an outer periphery of the fixed body is used to arrange the rotation permitting structure of the flexible printed circuit, which structure allows the rotation about the optical axis of the optical module. In other words, the rotation permitting structure is not provided on the inside but on the outside of the fixed body.

Consequently, the assembly, in which the movable body is rotatably fitted on the fixed body and, on the movable body as such, an optical module provided with a flexible printed circuit is post-fitted, is easily performed.

In the optical unit according to the present invention, the portion of the flexible printed circuit between the movable body-side fixing part and the fixed body-side fixing part is drawn around in an attitude causing a thickness direction of the flexible printed circuit to be a direction orthogonal to a direction of the optical axis.

According to this mode, the structure, in which the portion of the flexible printed circuit between the movable body-side fixing part and the fixed body-side fixing part is drawn around in an attitude causing a thickness direction of the flexible printed circuit to be a direction orthogonal to a direction of the optical axis, makes the rotation permitting structure of the flexible printed circuit easy to attain with a simple structure.

In the optical unit according to the present invention, the flexible printed circuit lies within a region occupied by the fixed body and the movable body in the optical axis direction.

According to this mode, if the optical unit is to be reduced in height dimension in the optical axis direction (for downsizing), such reduction is readily possible.

In the optical unit according to the present invention, the flexible printed circuit lies within a region occupied by the fixed body in the optical axis direction.

According to this mode, if the optical unit is to be reduced in height dimension in the optical axis direction (for downsizing), such reduction is readily possible.

In the optical unit according to the present invention, the fixed body-side fixing part protrudes outward in a radial direction more than a side, at which the fixed body-side fixing part is formed.

According to this mode, an outward protruding structure of the fixed body-side fixing part makes it possible to easily form a gap or the like allowing a swing of the flexible printed circuit that employs the position of the fixed body-side fixing part as a fulcrum and is attendant on the rotation of the movable body about the optical axis, which makes the rotation permitting structure of the flexible printed circuit attained with a simple structure.

In the optical unit according to the present invention, the movable body-side fixing part protrudes outward in the radial direction more than an adjacent outer periphery of the fixed body.

According to this mode, the structure, in which the movable body-side fixing part protrudes onto the outside of the adjacent fixed body, reduces the possibility that the flexible printed circuit scrapes an outer peripheral face of the fixed body when the optical module rotates about the optical axis.

In the optical unit according to the present invention, the flexible printed circuit has: a portion extending in a first direction from the movable body-side fixing part; and a portion extending in a second direction from the fixed body-side fixing part, the second direction being a direction different from the first direction.

According to this mode, the flexible printed circuit has a portion extending in a first direction from the movable body-side fixing part and a portion extending in a second direction from the fixed body-side fixing part, which makes the rotation permitting structure of the flexible printed circuit easier to attain.

In the optical unit according to the present invention, the flexible printed circuit is L-shaped with the portion extending in the first direction and the portion extending in the second direction.

According to this mode, the flexible printed circuit is L-shaped with the portion extending in the first direction and the portion extending in the second direction, which not only makes the rotation permitting structure of the flexible printed circuit easier to attain but reduces the possibility that an unnecessary reaction force from the rotation permitting structure acts on the movable body.

In the optical unit according to the present invention, the portion extending in the second direction has a length longer than a length of the portion extending in the first direction.

According to this mode, the portion extending in the second direction has a length longer than a length of the portion extending in the first direction, which efficiently reduces the possibility that an unnecessary reaction force from the rotation permitting structure acts on the movable body.

In the optical unit according to the present invention, the portion of the flexible printed circuit between the movable body-side fixing part and the fixed body-side fixing part is curved along a direction centering around the optical axis.

According to this mode, the portion of the flexible printed circuit between the movable body-side fixing part and the fixed body-side fixing part is curved along a direction centering around the optical axis, which makes the rotation permitting structure of the flexible printed circuit easy to attain.

In the optical unit according to the present invention, the portion of the flexible printed circuit between the movable body-side fixing part and the fixed body-side fixing part is folded back in two or more layers.

According to this mode, the flexible printed circuit is arranged without increasing the height dimension in the optical axis direction of the optical unit.

In the optical unit according to the present invention, the flexible printed circuit has a slit in a folded back portion that is capable of being folded back.

According to this mode, a slit is provided in the folded back portion, which suppresses a local swell of the folded back portion.

In the optical unit according to the present invention, the flexible printed circuit includes a reinforcement plate in at least one of a portion fixed to the movable body-side fixing part and a portion fixed to the fixed body-side fixing part, and the reinforcement plate is located between the flexible printed circuit and the fixing parts.

According to this mode, the reinforcement plate is located between the flexible printed circuit and the fixing parts, which makes a firm fixing of the flexible printed circuit to the fixing parts easy to attain. Moreover, the possibility of detachment due to the thermal change is reduced by selecting the material, whose thermal expansion coefficient is approximate to the thermal expansion coefficient of a material for the respective fixing parts, as a material for the reinforcement plate.

In the optical unit according to the present invention, the flexible printed circuit includes a reinforcement plate in at least one of a portion fixed to the movable body-side fixing part and a portion fixed to the fixed body-side fixing part, and the reinforcement plate is located on a side of the flexible printed circuit opposite with a side where the fixing parts are located.

According to this mode, the reinforcement plate is located on a side of the flexible printed circuit opposite with a side where the fixing parts are located, which makes a firm fixing of the flexible printed circuit to the fixing parts easy to attain.

In the optical unit according to the present invention, a rolling direction centers around the optical axis, and the optical module has a mechanism for correcting shake in a pitching direction and a yawing direction.

According to this mode, the optical module is able to perform shake correction in the pitching direction and the yawing direction in addition to shake correction in the rolling direction centering around the optical axis.

Effect of the Invention

According to the present invention, the assembly, in which the movable body is rotatably fitted on the fixed body and, on the movable body as such, an optical module provided with a flexible printed circuit is post-fitted, is easily performed.

DESCRIPTION OF EMBODIMENTS

The following description is made on configurations and operation modes of a drive device and an optical unit both according to the present invention, taking three embodiments. Embodiment 1 illustrated in FIGS. 1 through 6, Embodiment 2 illustrated in FIGS. 7 and 8, and Embodiment 3 illustrated in FIG. 9, as examples.

In the following description, in the description on Embodiment 1, general configurations of a drive device and an optical unit of the present invention are initially outlined, then specific configurations and operation modes of a drive device and an optical unit of the embodiment according to the present invention are described centering on a configuration of a principal part that constitutes a characteristic configuration of the present invention.

Subsequently, centering on the differences from Embodiment 1 as above, a specific configuration of an optical unit according to Embodiment 2 and a specific configuration of an optical unit according to Embodiment 3 are described.

Figure 10:
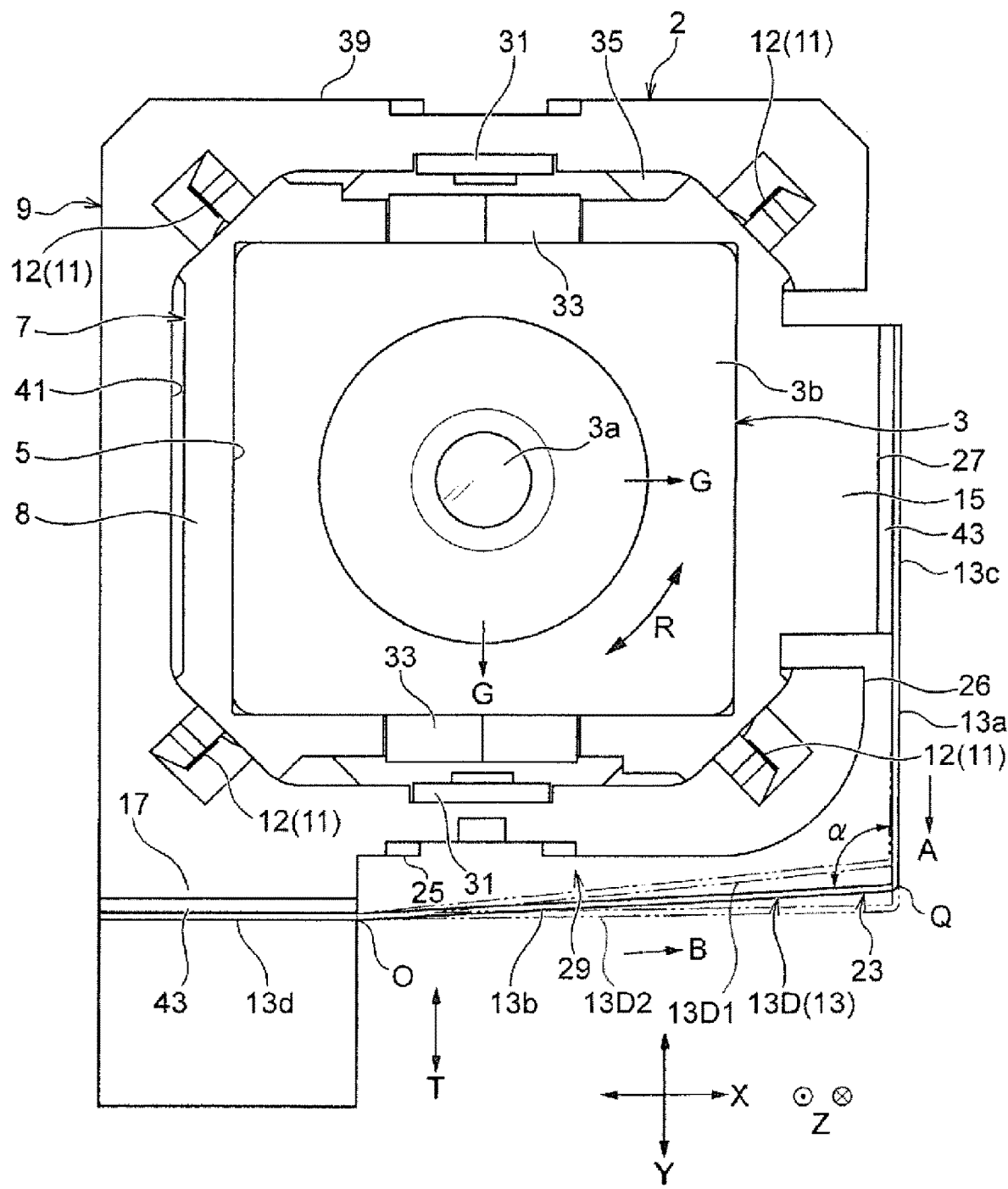
FIG. 10 is a diagram illustrating another embodiment of the present invention as a front view showing another exemplary form of drawing around of a flexible printed circuit.
Figure 11:
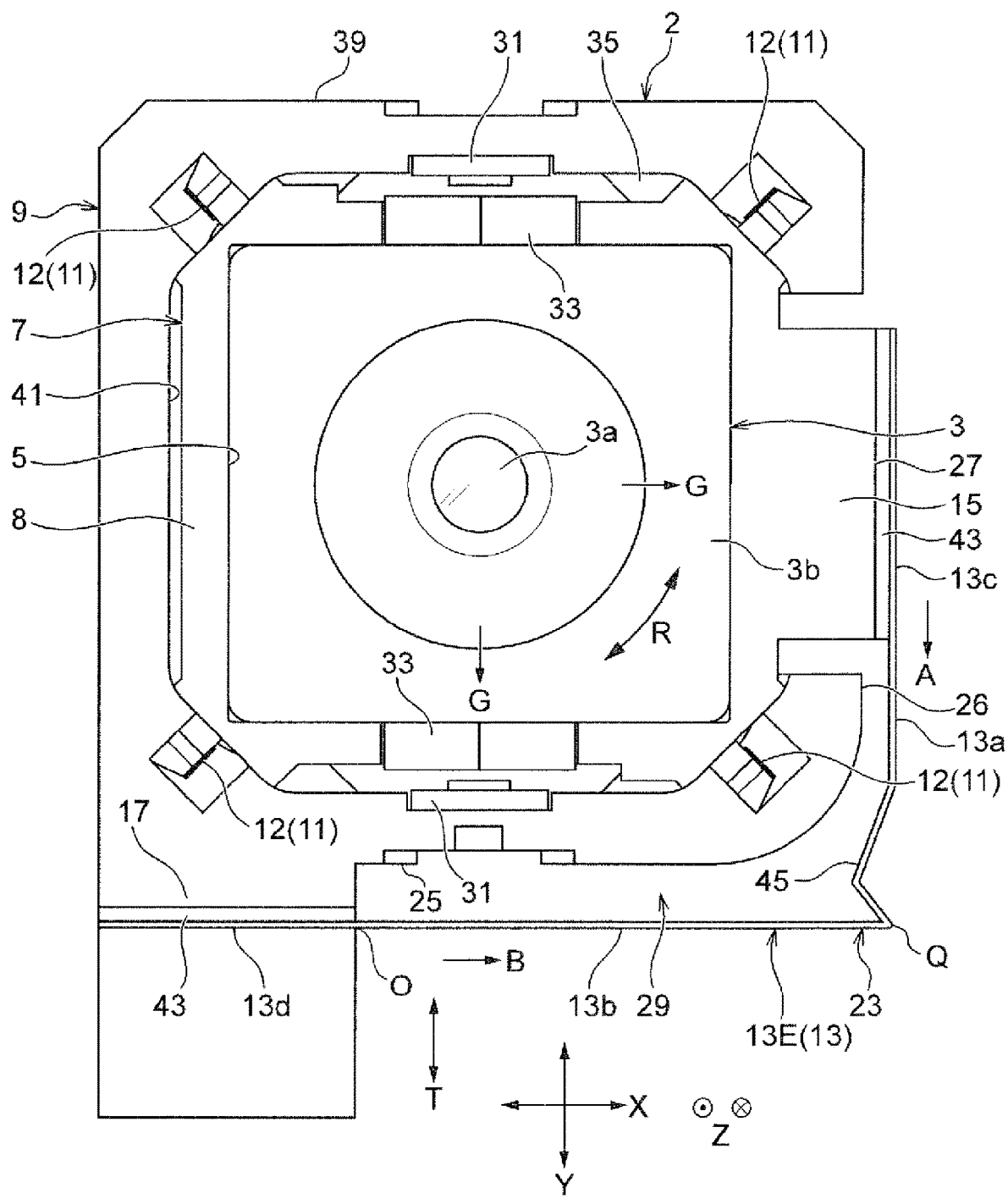
FIG. 11 is a diagram illustrating another embodiment of the present invention as a front view showing yet another exemplary form of drawing around of a flexible printed circuit.

Finally, a brief description is made on other embodiments of the present invention, including embodiments illustrated in FIGS. 10 and 11, that differ in partial configuration from the above three embodiments.

Embodiment 1

(1) Outline of General Configurations of Drive Device and Optical Unit (See FIGS. 1 Through 4)

A drive device 2 of the embodiment according to the present invention includes a movable body 7 including an attachment part 5, to which an optical module 3 is attached, a fixed body 9, and a support part 11 that rotatably supports the movable body 7 about an optical axis L of the optical module 3 in the state of being attached to the attachment part 5 with respect to the fixed body 9.

The movable body 7 includes a movable body-side fixing part 15, to which a flexible printed circuit (hereinafter also referred to as "FPC") 13 pulled out of the optical module 3 is fixed, and the fixed body 9 includes a fixed body-side fixing part 17, to which the FPC 13 is fixed. An optical unit 1 of the embodiment according to the present invention includes the movable body 7, which includes the optical module 3, the fixed body 9, and the support part 11, which rotatably supports the movable body 7 about the optical axis L of the optical module 3 with respect to the fixed body 9. The structures of the movable body 7 and the fixed body 9 are as described above.

Thus, the optical unit 1 of the embodiment according to the present invention has such a configuration that the optical module 3 and the FPC 13 are added to the configuration of the drive device 2 of the embodiment according to the present invention.

In the drive device 2, a portion D between the movable body-side fixing part 15 and the fixed body-side fixing part 17 in a region C along an outer periphery of the fixed body 9 is a region drawn around in an attitude causing a thickness direction T of the FPC 13 to be a direction X and a direction Y both orthogonal to a direction Z of the optical axis L.

In terms of the FPC 13 in the optical unit 1, the FPC 13 is drawn around with the portion D between the two fixing parts 15 and 17 in the region C along the outer periphery of the fixed body 9, and a portion of the FPC 13 that exists in the portion D between the fixing parts 15 and 17 has a structure 23 permitting the movable body 7 to rotate about the optical axis L.

The rotation permitting structure 23 of the FPC 13 is not provided on the inside of the fixed body 9 but on the outside of the fixed body 9, so that the assembly, in which the optical module 3 provided with the FPC 13 is post-fitted on the movable body 7, is made easy.

The drive device 2 and the optical unit 1 of the embodiment according to the present invention are each a relatively small device or unit that is used as a thin camera and the like to be installed in a cellular phone with camera, a tablet type PC or the like. The drive device 2 and the optical unit 1 each basically include the support part 11, which allows the optical module 3 to move in a rolling direction (direction of shake around the optical axis L) R. and an actuator that performs shake correction in the rolling direction R on the optical module 3.

Although not illustrated, the optical module 3 according to the present embodiment may include a supporting structure not illustrated that is provided on a device and a unit of the types as above and allows the optical module 3 to move in a pitching (vertical shake) direction Y and a yawing (horizontal shake) direction X. and an actuator that performs shake correction in the pitching direction Y and the yawing direction X on the optical module 3.

The optical module 3 includes a lens 3a on an object side +Z, and is a module having an optical instrument for imaging or the like built in a housing 3b in the form of a rectangular case, for instance.

The optical module 3 is supported by a holder frame 8 in the form of a rectangular frame, for instance, that is so provided as to surround four faces of the optical module 3 exclusive of the front face, in which the lens 3a is provided, and the back face on the opposite side. Using two faces of the holder frame 8 that are opposite to each other, a set of magnets 33 for detecting the rolling are fitted on the outside of the faces.

Figure 3:
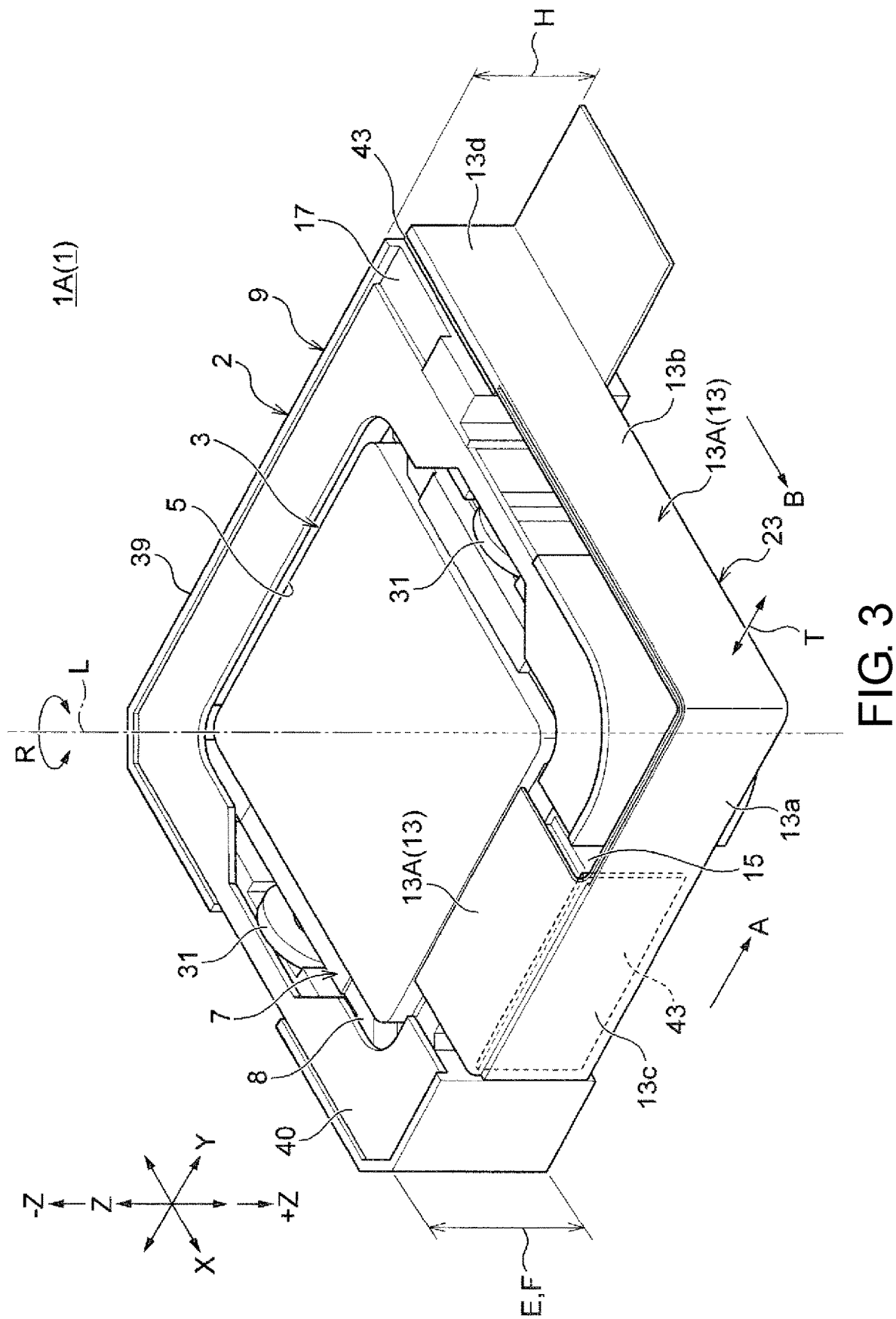
FIG. 3 is a diagram illustrating Embodiment 1 of the present invention as a perspective view from a back side of the optical unit.
Figure 4:
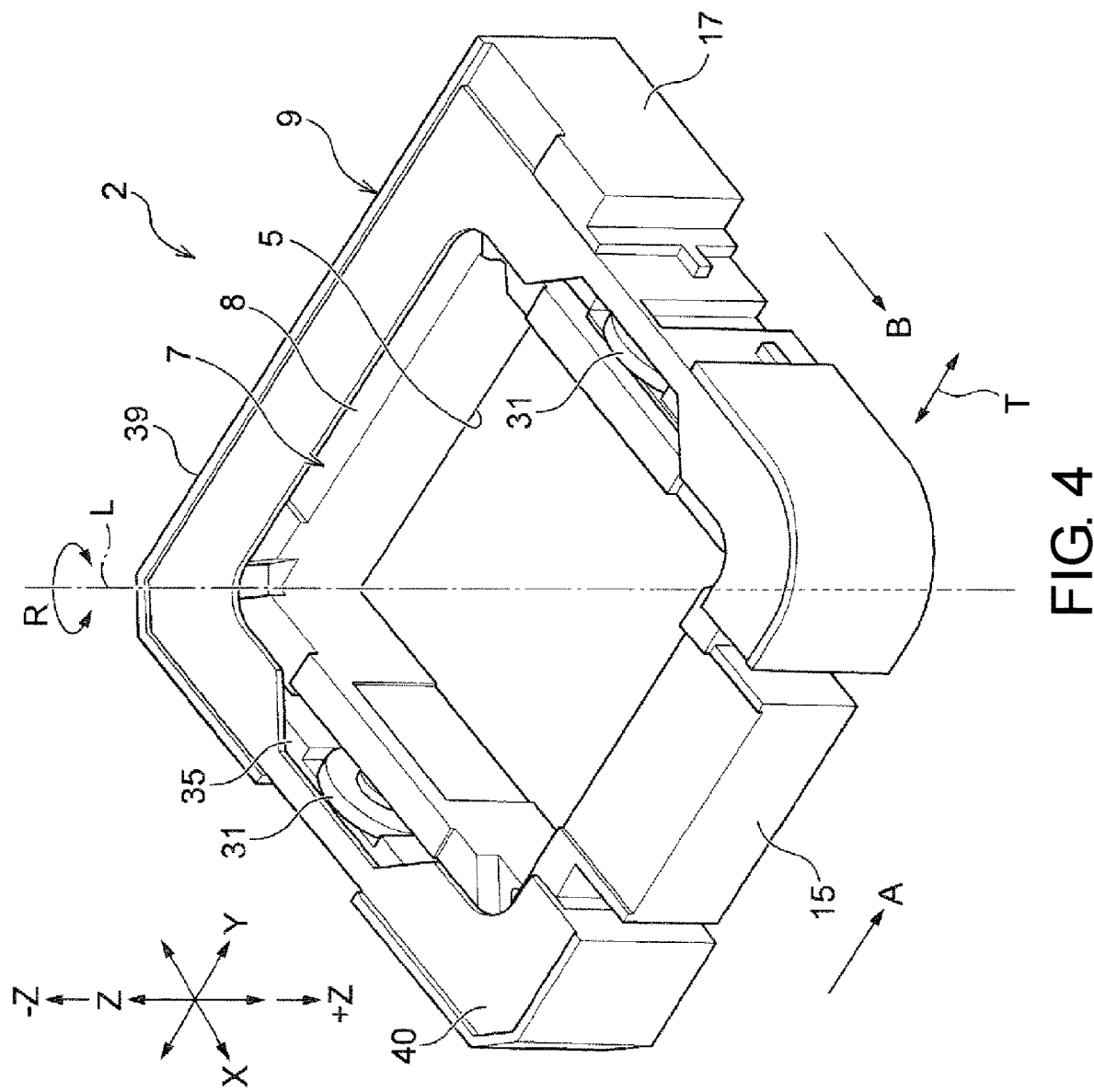
FIG. 4 is a diagram illustrating Embodiment 1 of the present invention as a perspective view from a back side of a drive device.
Figure 5:
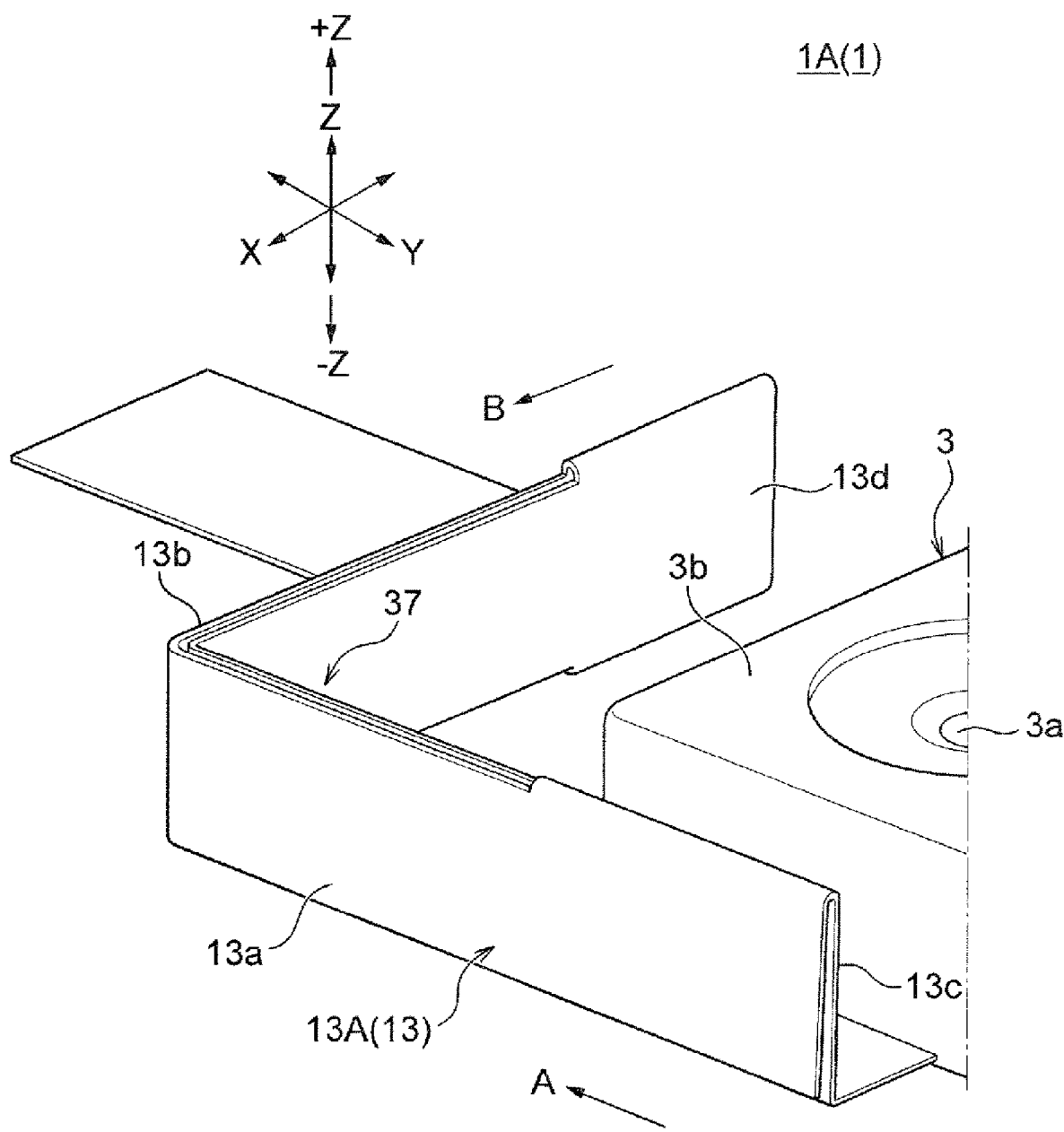
FIG. 5 is a diagram illustrating Embodiment 1 of the present invention as a perspective view showing an exemplary form of drawing around of a flexible printed circuit.

As illustrated in FIG. 3, one end of the FPC 13 is so arranged as to border on the back face of the optical module 3, the FPC 13 is so pulled out as to pass through the above-mentioned region C along the outer periphery of the fixed body 9, and the other end of the FPC 13 is fitted on the fixed body side.

The holder frame 8, which is provided with the optical module 3 and the magnets 33 moving in the rolling direction R along with one end of the FPC 13, constitutes the movable body 7.

The fixed body 9 has a window 41 in a face on the object side +Z, and includes an outer casing 39 in the form of a rectangular container, for instance, that is one size larger than the movable body 7 and has an opened face on a side −Z opposite from the side where an object exists, and a back plate 40 that covers an outer periphery of the optical module 3 in the opened face on the side −Z opposite from the side where an object exists, exclusive of a pulling out start end of the FPC 13.

Inside the outer casing 39, a coil fitting frame 35 is inseparably fitted, and a set of coils 31 for correcting detection of the rolling are fitted on the coil fitting frame 35 in positions opposite to the set of magnets 33. In the present embodiment, a patterned board with coils included, as a pattern, in a printed circuit is employed as an example of the coils 31.

In each of four corner portions of the holder frame 8 of the movable body 7 and the four corners of the coil fitting frame 35 of the fixed body 9, which corners are opposite to the corner portions, respectively, an elastic member 12 in the form of a leaf spring, for instance, is provided. The support part 11, which supports the movable body 7 in the state of being able to move in the rolling direction R, is configured by connecting one end of the elastic member 12 on the movable body 7 side and the other end on the fixed body 9 side.

In the present embodiment, a mechanism (not illustrated) for the detection and correction of the movement of the optical module 3 in the yawing direction X and the pitching direction Y and the amount of such movement is configured as follows.

In the interior of the optical module 3, a biaxial correction actuator is provided that has a structure of a mechanism other than a gimbal mechanism, includes a machinery part to shift a lens barrel in a direction orthogonal to the optical axis, and detects the amount of shift of the lens barrel to carry out actuation with two sets of coils and magnets.

(2) Specific Configurations of Drive Device and Optical Unit (See FIGS. 1 Through 6)

Next, specific configurations of the drive device 2 and an optical unit 1A both according to the present embodiment are described centering on a configuration of a principal part that constitutes a characteristic configuration of the embodiment according to the present invention.

First of all, in the configuration of the present embodiment, the portion D of an FPC 13A between the movable body-side fixing part 15 and the fixed body-side fixing part 17 is drawn around in an attitude where the thickness direction T of the FPC 13A is set to the direction X and the direction Y both orthogonal to the direction Z of the optical axis L.

Such configuration allows a smooth movement of the FPC 13A and makes the rotation permitting structure 23 simple and compact.

In addition, in the present embodiment, the FPC 13A is so arranged as to lie within a region E (within the range of a region E) occupied by the fixed body 9 and the movable body 7 in an optical axis direction Z. In the configuration of the present embodiment, moreover, the FPC 13A lies within a region F occupied by the fixed body 9 in the optical axis direction Z.

Such configuration makes it possible to provide the drive device 2 and the optical unit 1A, which are each small in height dimension H in the optical axis direction Z and compact in the optical axis direction Z, and are each suitable for a thin camera and the like.

Figure 1:
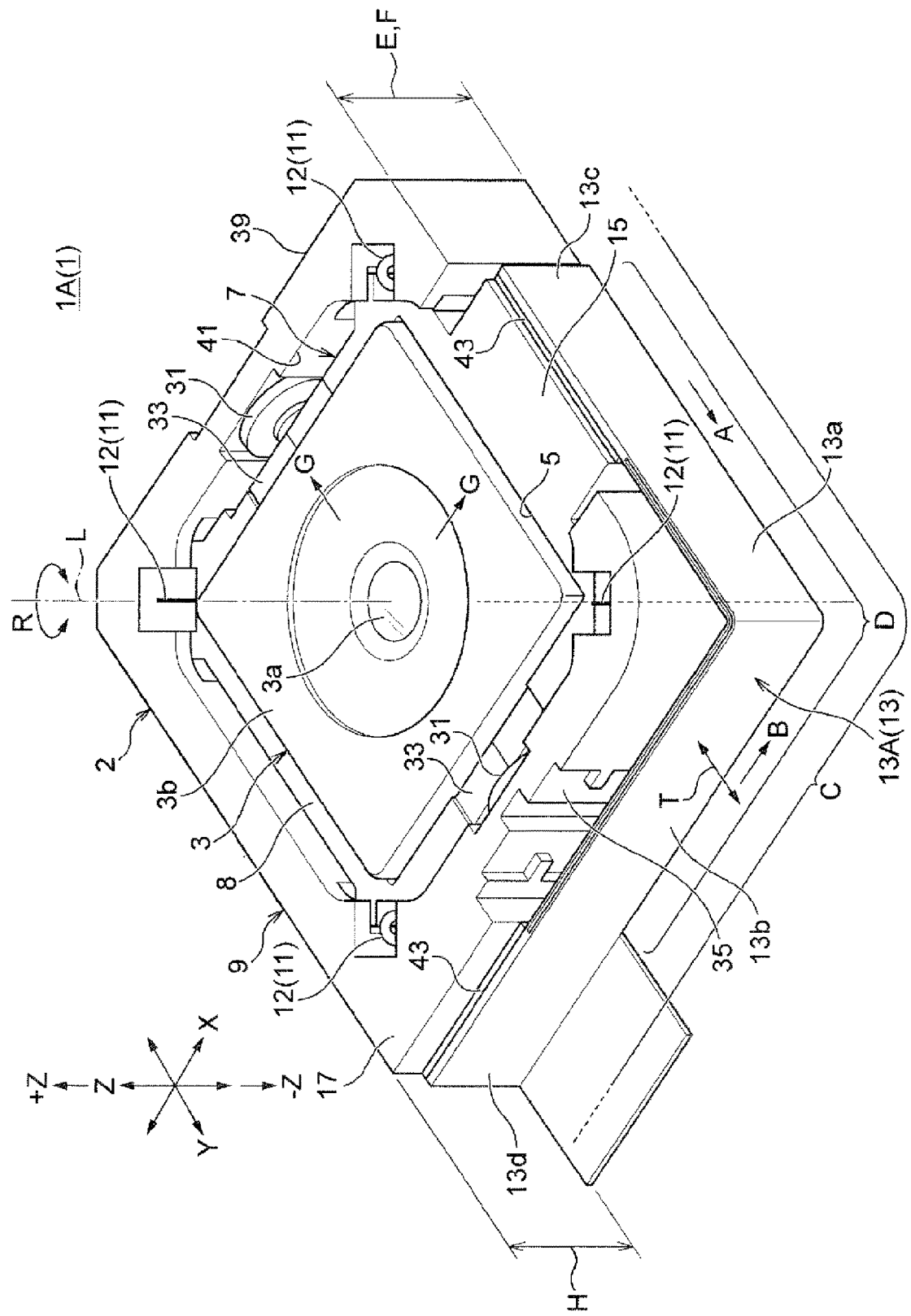
FIG. 1 is a diagram illustrating Embodiment 1 of the present invention as a perspective view from a front side of an optical unit.
Figure 2:
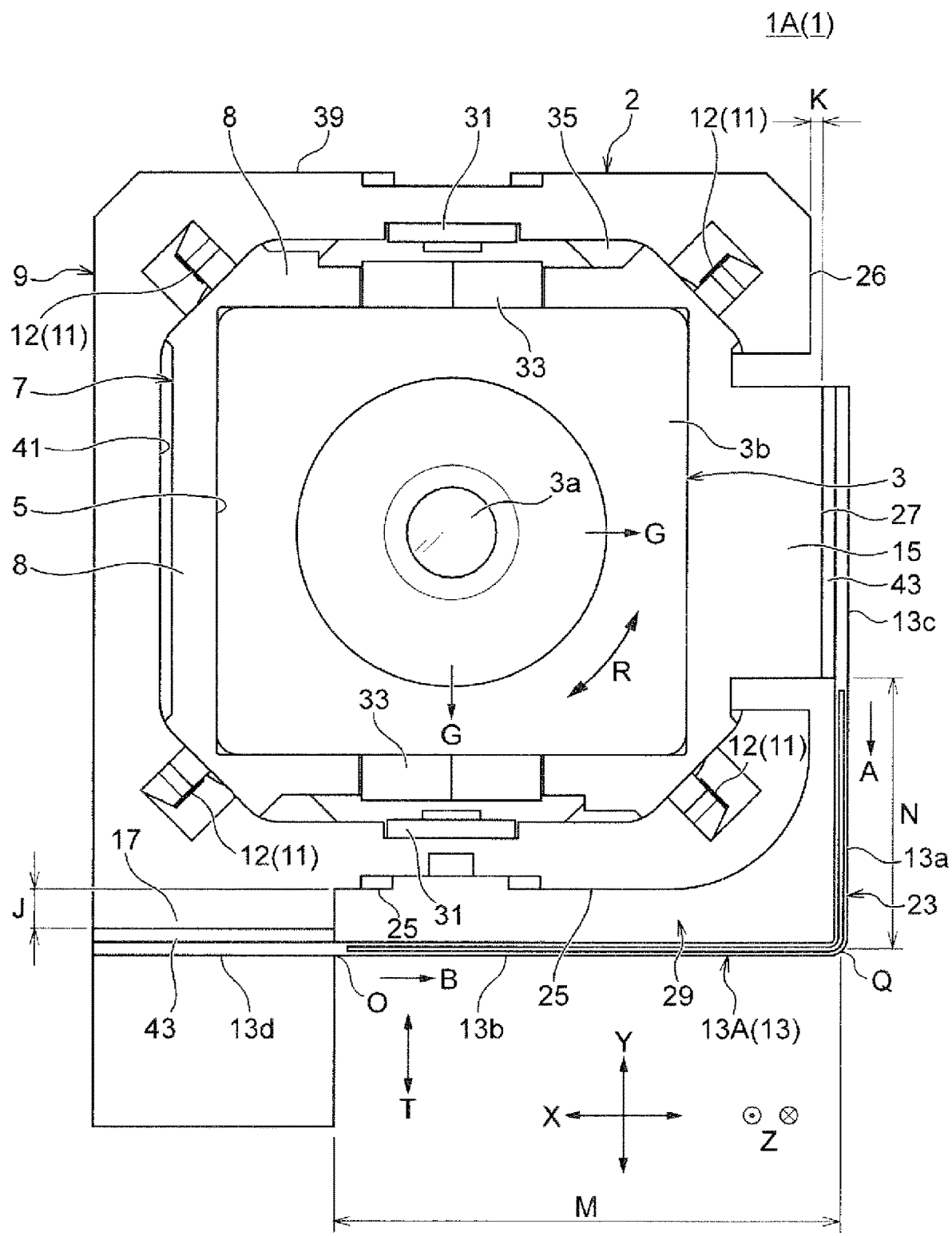
FIG. 2 is a diagram illustrating Embodiment 1 of the present invention as a front view of the optical unit.

In the present embodiment, the fixed body-side fixing part 17 is provided on the outer casing 39 of the fixed body 9 in a position close to the left end of a lower side 25 in FIG. 2, and the fixed body-side fixing part 17 is formed with a convex portion in a rectangular shape, for instance, that protrudes outward in a radial direction G more than the lower side 25 by a specified amount J.

Such configuration makes it possible to form, on the right in FIG. 2 of the fixed body-side fixing part 17, a swing permitting space 29 allowing a swing of the FPC 13A attendant on the movement in the rolling direction R of the optical module 3.

The term "swing" is herein used to refer to the movement and deformation of the FPC 13A attendant on the movement in the rolling direction R of the optical module 3. The FPC 13A moves and deforms, or swings, with respect to the position, in which the FPC is fixed to the fixed body-side fixing part 17, as a fulcrum O. The amount J of protrusion of the fixed body-side fixing part 17 is set based on the amount of displacement in the rolling direction R of the optical module 3, and the like.

In the present embodiment, the movable body-side fixing part 15 is provided on the holder frame 8 of the movable body 7 in a middle portion in the direction Y of a lateral face 26 (right side with respect to the lower side 25) in FIG. 2. The movable body-side fixing part 15 is formed so that a lateral face 27 thereof may be in a position further protruding outward in the radial direction G and protrude more than the lateral face 26 in FIG. 2 of the fixed body 9 adjacent to the movable body-side fixing part 15 by a specified amount K. The movable body-side fixing part 15 is formed with a convex portion in a rectangular shape, for instance, as is the case with the fixed body-side fixing part 17.

Such configuration causes the FPC 13A pulled out of the movable body-side fixing part 15 to separate from an opposite outer peripheral face of the outer casing 39 of the fixed body 9 by the amount K of protrusion, so that it is possible to reduce the possibility that the FPC 13A scrapes an outer peripheral face of the outer casing 39 when the FPC 13A moves following the movement in the rolling direction R of the optical module 3.

In the present embodiment, the direction of a fixing face of the movable body-side fixing part 15 is set to a first direction A, and the direction of a fixing face of the fixed body-side fixing part 17 is set to a second direction B. As illustrated in FIG. 2, in the present embodiment, the first direction A and the second direction B are set to different directions orthogonal to each other.

Consequent on the above, the FPC 13A has a portion 13a extending from the movable body-side fixing part 15 in the first direction A and a portion 13b extending from the fixed body-side fixing part 17 in the second direction B as a direction different from the first direction A.

In the present embodiment, moreover, the portion 13a of the FPC 13A extending in the first direction A and the portion 13b of the FPC 13A extending in the direction B are so arranged as to form an L shape.

Such configuration, in which an L shape is formed, makes it possible to reduce the possibility that an unnecessary reaction force from the rotation permitting structure 23 acts on the movable body 7 side, and to cause the rotation permitting structure 23 to be a simple structure.

In the present embodiment, a length M of the portion 13b of the FPC 13A extending in the second direction B on the fixed body-side fixing part 17 side is set to be longer than a length N of the portion 13a extending in the first direction A on the movable body-side fixing part 15 side.

As a result of such configuration, the portion 13b of the FPC 13A extending in the second direction B as a portion directly joined to the fulcrum O smoothly swings when the optical module 3 moves in the rolling direction R, and it is possible to efficiently reduce the possibility that an unnecessary reaction force from the rotation permitting structure 23 acts on the movable body 7 side.

Figure 6:
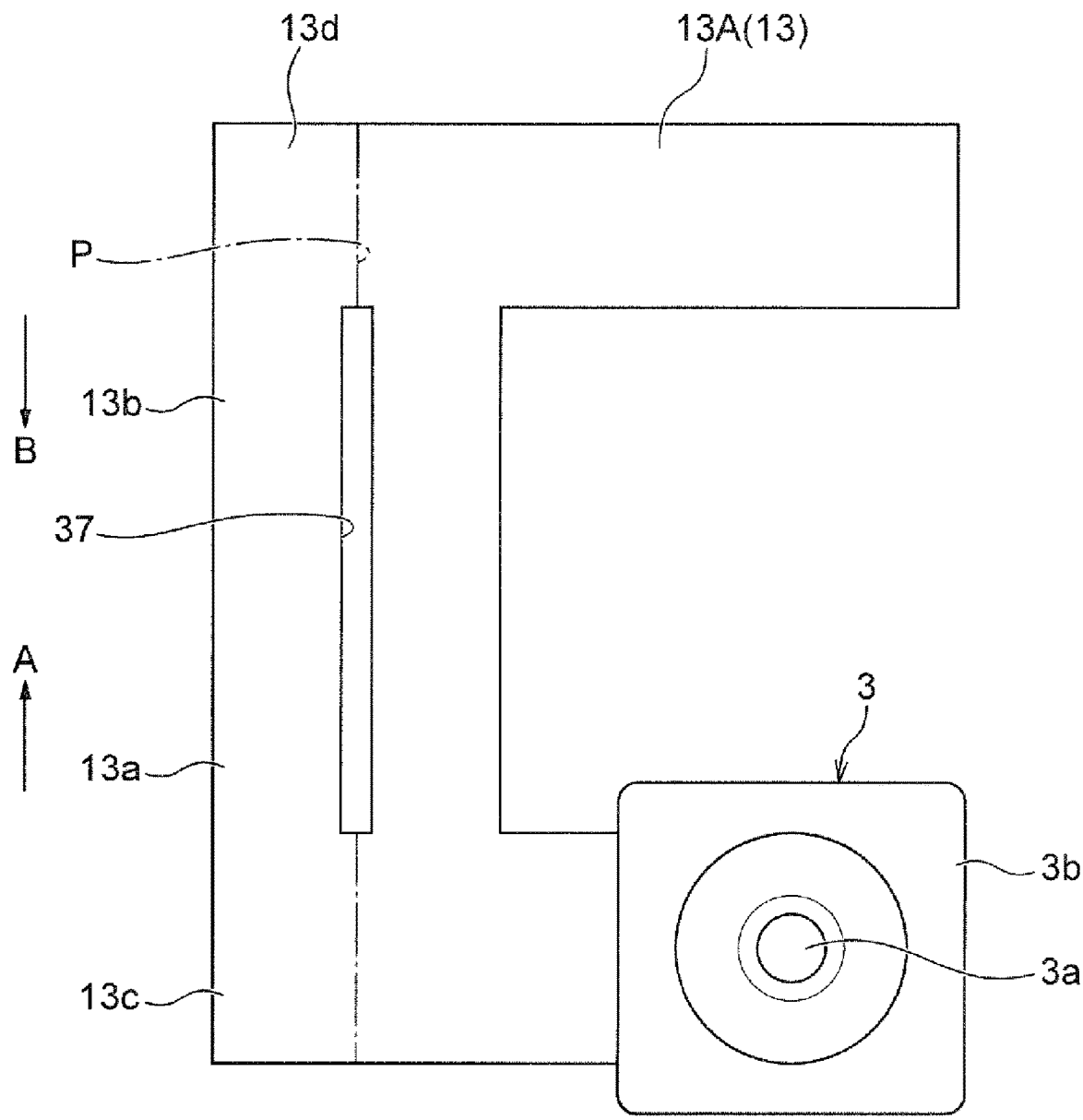
FIG. 6 is a diagram illustrating Embodiment 1 of the present invention as a plan view showing a spread state of the flexible printed circuit.

As illustrated in FIG. 6, the FPC 13A used in the present embodiment has a development form C-shaped in planar view. In addition, an intermediate portion of the FPC 13A is formed somewhat wide in comparison with the rest.

The intermediate portion of the FPC 13A as formed wide constitutes a portion of the FPC 13A that is included in the portion D between the movable body-side fixing part 15 and the fixed body-side fixing part 17, and the included portion is folded back in the optical axis direction Z in two or more layers so as to make the portion lie within the range of the region E or F, where the height dimension H in the optical axis direction Z is held in an axial direction Z.

In the present embodiment, a longitudinal center of the intermediate portion of the FPC 13A to be folded back in the optical axis direction Z constitutes a folding back line P, for instance, and a slit 37 for facilitating the folding back of the FPC 13A is provided on the folding back line P over an appropriate length. The slit 37 is also effective at suppressing a local swell of a folded back portion of the FPC 13A.

Furthermore, in the present embodiment, reinforcement plates 43 each in the form of a rectangular flat plate, for instance, are provided on both of a portion 13c of the FPC 13A that is fixed to the movable body-side fixing part 15 and a portion 13d of the FPC 13A that is fixed to the fixed body-side fixing part 17.

As an example, the reinforcement plates 43 are provided between the two fixing parts 15 and 17 on one hand and the portions 13c and 13d of the FPC 13A to be fixed to the fixing parts on the other.

Preferably, the reinforcement plates 43 are integrally fitted on the FPC 13A in advance. The reinforcement plates 43 are preferably formed of a material excellent in mechanical strength and heat resistance as well. For instance, a material having a thermal expansion coefficient approximate to the thermal expansion coefficient of a material for the two fixing parts 15 and 17 is selected as a material for the reinforcement plates 43, which reduces the possibility of detachment of the FPC 13A due to the thermal change.

The reinforcement plates 43 may be arranged on the outside of the FPC 13A, that is to say, on a side of the FPC 13A opposite with the side, on which the fixing parts 15 and 17 are located, or arranged in the state of being inserted in the FPC 13A as multiple-folded. In other words, the reinforcement plates 43 may be located on the outermost peripheral side of the FPC 13A or between folds of the folded FPC 13A.

(3) Operation Modes of Drive Device and Optical Unit (See FIGS. 1 Through 6)

Next, operation modes of the drive device 2 and the optical unit 1A both according to the present embodiment, which have the configurations as above, are described along with the movement (shake) in the rolling direction R of the optical module 3 and the shake correction on the optical module.

If a shake in the rolling direction R is applied to the optical module 3 from the outside, the shake in the rolling direction R of the optical module 3 is transmitted to the holder frame 8 holding the optical module 3, and the set of magnets 33 for detecting the rolling as fitted on the holder frame 8 are displaced in the rolling direction R.

The displacement of the magnets 33 for detecting the rolling appears as a change in relative position to the set of coils 31 for detecting the rolling, which are fitted on the coil fitting frame 35, the amount of the change in magnetic flux density, which is caused by the change in relative position, is detected by a magnetic sensor not illustrated or the like, and shake correction in the rolling direction R is performed on the optical module 3 based on the detected amount.

After the shake correction in the rolling direction R, current feeding to a driving source is stopped and the elastic member 12 is restored to the original state by the spring characteristics of the elastic member 12.

If the optical module 3 moves in the rolling direction R, the FPC 13A held by the two fixing parts 15 and 17 also moves, while changing the shape, correspondingly to the amount of rotation and the rotation direction of the optical module.

In that case, the portion 13a of the FPC 13A extending in the first direction A linearly moves almost along the first direction A.

On the other hand, the portion 13b of the FPC 13A extending in the second direction B swings on a portion fixed to the fixed body-side fixing part 17 as the fulcrum O so that a point Q of connection with the portion 13a extending in the first direction A may be moved in a direction almost agreeing with the first direction A. At this time, the FPC 13A smoothly moves without generating a reaction force affecting the movement of the optical module 3, which allows an accurate shake correction on the optical module 3.

In the drive device 2 and the optical unit 1A both according to the present embodiment, which have the configurations as above, the FPC 13A is drawn around along the outer periphery of the fixed body 9, so that an operation for assembling the optical module 3 provided with the FPC 13A in the drive device 2 is easy to perform as a post fitting operation.

The drawing around of the FPC 13A as described above makes it possible to provide the optical unit 1A, which is compactified in the optical axis direction Z and in the directions X and Y both orthogonal to the optical axis L. and to arrange the FPC 13A with no influences on the movement of the optical module 3.

Figure 7:
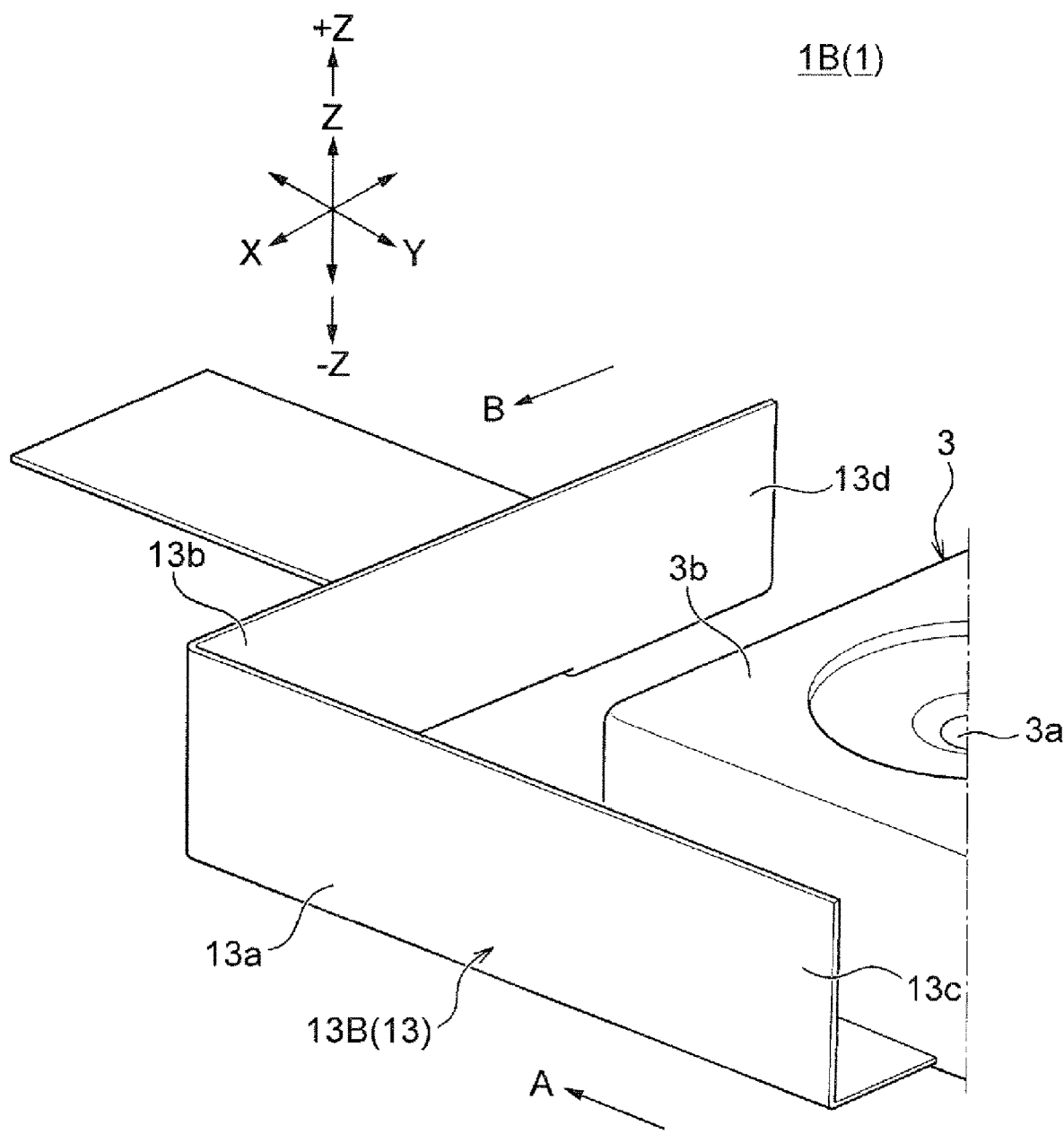
FIG. 7 is a diagram illustrating Embodiment 2 of the present invention as a perspective view showing an exemplary form of drawing around of a flexible printed circuit.
Figure 8:
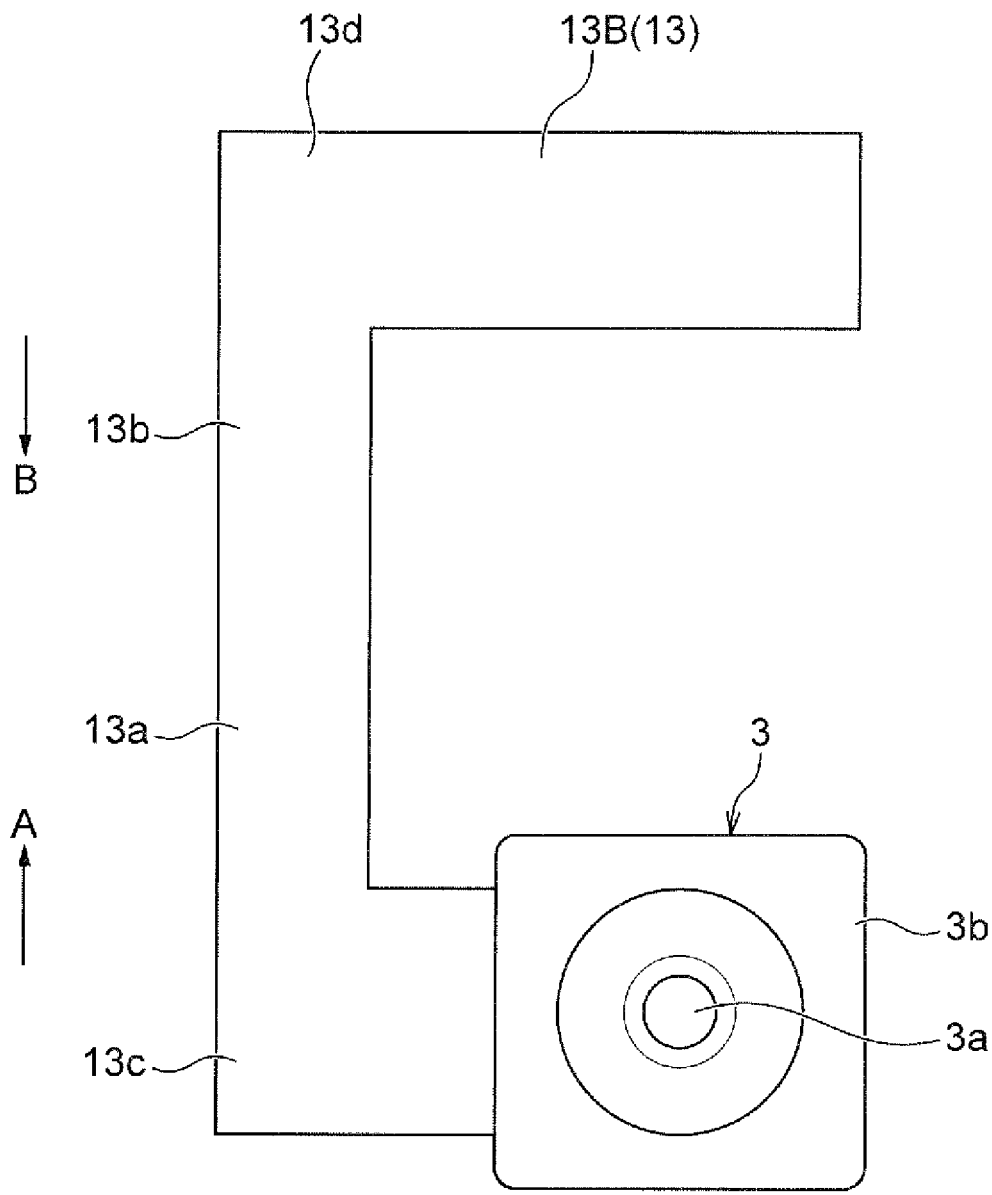
FIG. 8 is a diagram illustrating Embodiment 2 of the present invention as a plan view showing a spread state of the flexible printed circuit.

Embodiment 2 (See FIGS. 7 and 8)

Next, description is made on a configuration of an optical unit 1B according to Embodiment 2, in which the shape of the flexible printed circuit (FPC) 13 and the mode of drawing around of the FPC 13 are changed.

As the drive device 2, the drive device 2 as described in Embodiment 1 may be used.

In this embodiment, therefore, description is not made on configurations similar to those in Embodiment 1 but focused on configurations that are different from the configurations in Embodiment 1, that is to say, peculiar to Embodiment 2.

As illustrated in FIG. 8, in the present embodiment, a flexible printed circuit (FPC) 13B that has a middle portion narrower than that of the FPC 13A illustrated in FIG. 6 in Embodiment 1 is used as the flexible printed circuit (FPC) 13B. The width dimension of the middle portion of the FPC 13B is equal to or smaller than the height dimension of the region E occupied by the fixed body 9 and the movable body 7 in the optical axis direction Z, and is preferably set to be equal to or smaller than the height dimension of the region F occupied by the fixed body 9 in the optical axis direction Z.

As illustrated in FIG. 7, the FPC 13B in the present embodiment is not folded back in the middle but is drawn around while maintaining the thickness as a single layer, and the slit 37 as provided on the FPC 13A according to Embodiment 1 is not provided.

The thickness of the FPC 13B is desirably set to 0.1 mm or less, and such setting allows a smooth movement or deformation of the FPC 13B following the movement in the rolling direction R of the optical module 3.

The optical unit 1B according to the present embodiment, which has the configuration as above, exerts the same functions and effects as Embodiment 1, so that it is possible to facilitate the assembly, in which the FPC 13B is post-fitted, to downsize the optical unit 1B, and to draw around the FPC 13B with no influences on the optical module 3.

Figure 9:
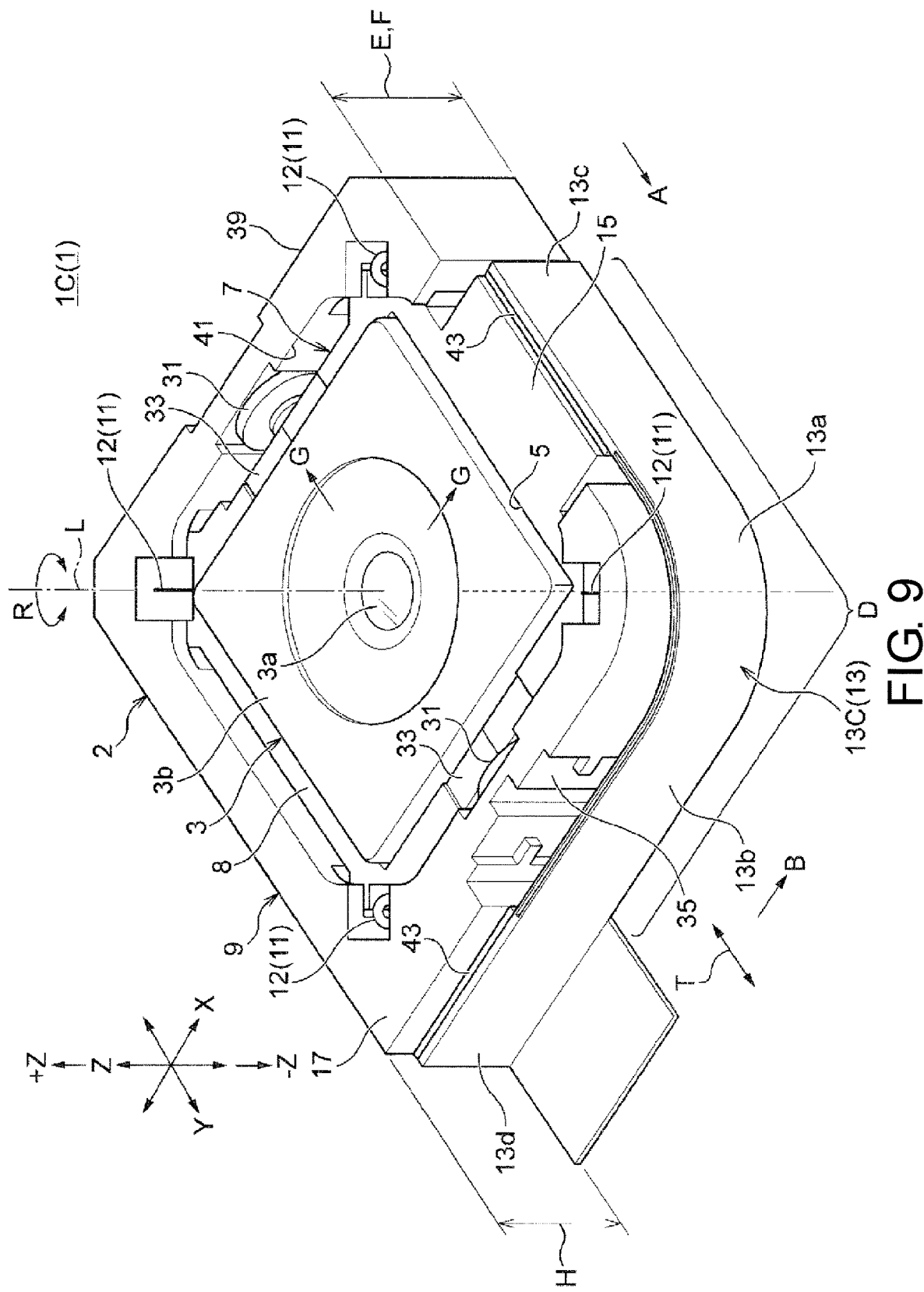
FIG. 9 is a diagram illustrating Embodiment 3 of the present invention as a perspective view from a front side of an optical unit.

Embodiment 3 (See FIG. 9)

Next, description is made on a configuration of an optical unit 1C according to Embodiment 3, in which the mode of drawing around of an intermediate portion of the flexible printed circuit (FPC) 13 is changed.

As the drive device 2, the drive device 2 as described in Embodiment 1 may be used.

In this embodiment, therefore, description is not made on configurations similar to those in Embodiment 1 but focused on configurations that are different from the configurations in Embodiment 1, that is to say, peculiar to Embodiment 3.

As illustrated in FIG. 9, in the present embodiment, an intermediate portion of a flexible printed circuit (FPC) 13C that exists in the portion D between the movable body-side fixing part 15 and the fixed body-side fixing part 17 is curved along a direction centering around the optical axis L. The intermediate portion of the FPC 13C may be curved as a whole, or part (e.g., a cornered section) of the intermediate portion of the FPC 13C may only be curved.

The optical unit 1C according to the present embodiment, which has the configuration as above, exerts the same functions and effects as Embodiment 1, so that it is possible to facilitate the assembly, in which the FPC 13C is post-fitted, to downsize the optical unit 1C, and to draw around the FPC 13C with no influences on the optical module 3.

It, however, is predicted in the present embodiment that a reaction force due to the flection of the curved portion affects the movement in the rolling direction R of the optical module 3 if the FPC 13C has a larger thickness. Consequently, it is preferable that the FPC 13C, which has as small a thickness as possible, is used so as to reduce the influence of the reaction force as above.

OTHER EMBODIMENTS

The drive device 2 and the optical unit 1 according to the above embodiments of the present invention basically have the configurations as described above, while it is naturally possible to perform modification, omission, and the like on a partial configuration without departing from the gist of the claimed invention.

For instance, use may be made of the rotation permitting structure 23 illustrated in FIG. 10, which is configured such that the portion 13a of a flexible printed circuit (FPC) 13D extending in the first direction A and the portion 13b of the FPC 13D extending in the second direction B are so connected together as to intersect at an angle α of 90° or more as illustrated in the figure.

If the rotation permitting structure 23 with such configuration is used, a swing of the FPC 13D following the movement in the rolling direction R of the optical module 3 covers a range indicated with imaginary lines in FIG. 10. In this regard, an imaginary line 13D1 indicates the position of the FPC 13D when the optical module 3 rotates counterclockwise, and an imaginary line 13D2 indicates the position of the FPC 13D when the optical module 3 rotates clockwise. The amount of extension outward in the radial direction G of the FPC 13D (the imaginary line 13D2) is thus particularly reduced, so that the above configuration is effective if the clearance between the optical unit 1 and the camera housing, in which the optical unit is installed, is small, for instance.

As illustrated in FIG. 11, a bend 45 in the form of bellows may be provided on part of an intermediate portion of a flexible printed circuit (FPC) 13E, such as part of the portion 13a extending in the first direction A, and used as the rotation permitting structure 23. If such configuration is employed, the swing of the portion 13b extending in the second direction B and the expansion and contraction of the bend 45 allow a smooth movement or deformation of the FPC 13E without the influence of a reaction force on the optical module 3.

In addition to the above, if the intermediate portion of the flexible printed circuit (FPC) 13 is to be folded back, the frequency of folding back is not limited to two times but may be three or more times within the range allowing a smooth movement or deformation of the FPC 13. While the layered structure to be applied to the flexible printed circuit (FPC) 13 may be single-sided or double-sided, it is desirable even in such case that the thickness of the flexible printed circuit (FPC) 13 is set to 0.1 mm or less in order to ensure a smooth movement of the flexible printed circuit (FPC) 13.

A corner portion of the outer casing 39 of the fixed body 9 that exists in the portion D between the movable body-side fixing part 15 and the fixed body-side fixing part 17 is desirably formed in a smooth curve shape in order to allow a smooth movement of the flexible printed circuit (FPC) 13.

The invention claimed is:

1. A drive device comprising:
a movable body including an attachment part, to which an optical module is attached;
a fixed body; and
a support part configured to rotatably support the movable body about an optical axis of the optical module in a state of being attached to the attachment part with respect to the fixed body,
wherein the movable body includes a movable body-side fixing part, to which a flexible printed circuit pulled out of the optical module is fixed,
wherein the fixed body includes a fixed body-side fixing part, to which the flexible printed circuit is fixed, and
wherein a portion of the flexible printed circuit between the movable body-side fixing part and the fixed body-side fixing part in a region along an outer periphery of the fixed body is a region drawn around in an attitude causing a thickness direction of the flexible printed circuit to be a direction orthogonal to a direction of the optical axis,
wherein the portion of the flexible printed circuit between the movable body-side fixing part and the fixed body-side fixing part has a structure permitting the movable body to rotate about the optical axis,
wherein the flexible printed circuit has:
a first portion extending in a first direction from the movable body-side fixing part; and
a second portion extending in a second direction from the fixed body-side fixing part;
the second direction being a direction different from the first direction,
wherein the flexible printed circuit is L-shaped with the first portion extending in the first direction and the second portion extending in the second direction;
wherein
the first direction and the second direction are orthogonal to the direction of the optical axis, and
the first direction and the second direction are disposed on a X-Y plane that intersect the thickness direction of the flexible printed circuit.

2. The drive device according to claim 1, wherein
the fixed body-side fixing part protrudes outward in a radial direction more than a side, at which the fixed body-side fixing part is formed.

3. The drive device according to claim 1, wherein
a fixing face direction of the movable body-side fixing part is different from a fixing face direction of the fixed body-side fixing part.

4. An optical unit comprising:
a movable body including an optical module;
a fixed body; and
a support part configured to rotatably support the movable body about an optical axis of the optical module with respect to the fixed body,
wherein the movable body includes a movable body-side fixing part, to which a flexible printed circuit pulled out of the optical module is fixed,
wherein the fixed body includes a fixed body-side fixing part, to which the flexible printed circuit is fixed,
wherein the flexible printed circuit is drawn around with a portion between the movable body-side fixing part and the fixed body-side fixing part in a region along an outer periphery of the fixed body, and
wherein the portion of the flexible printed circuit between the movable body-side fixing part and the fixed body-side fixing part has a structure permitting the movable body to rotate about the optical axis,
wherein the flexible printed circuit has:
a first portion extending in a first direction from the movable body-side fixing part; and
a second portion extending in a second direction from the fixed body-side fixing part;
the second direction being a direction different from the first direction,
wherein the flexible printed circuit is L-shaped with the first portion extending in the first direction and the second portion extending in the second direction;
wherein
the first direction and the second direction are orthogonal to the direction of the optical axis, and
the first direction and the second direction are disposed on a X-Y plane that intersect a thickness direction of the flexible printed circuit.

5. The optical unit according to claim 4, wherein
the portion of the flexible printed circuit between the movable body-side fixing part and the fixed body-side fixing part is drawn around in an attitude causing the thickness direction of the flexible printed circuit to be a direction orthogonal to a direction of the optical axis.

6. The optical unit according to claim 4, wherein
the flexible printed circuit lies within a region occupied by the fixed body in a direction of the optical axis.

7. The optical unit according to claim 6, wherein
the flexible printed circuit lies within a region occupied by the fixed body and the movable body in the direction of the optical axis.

8. The optical unit according to claim 4, wherein
the fixed body-side fixing part protrudes outward in a radial direction more than a side, at which the fixed body-side fixing part is formed.

9. The optical unit according to claim 8, wherein
the movable body-side fixing part protrudes outward in the radial direction more than an adjacent outer periphery of the fixed body.

10. The optical unit according to claim 4, wherein
the second portion extending in the second direction has a length longer than a length of the first portion extending in the first direction.

11. The optical unit according to claim 4, wherein
the portion of the flexible printed circuit between the movable body-side fixing part and the fixed body-side fixing part is curved along a direction centering around the optical axis.

12. The optical unit according to claim 4, wherein
the portion of the flexible printed circuit between the movable body-side fixing part and the fixed body-side fixing part is folded back in two or more layers.

13. The optical unit according to claim 12, wherein
the flexible printed circuit has a slit in a folded back portion that is capable of being folded back.

14. The optical unit according to claim 4, wherein
the flexible printed circuit includes a reinforcement plate in at least one of a portion fixed to the movable body-side fixing part and a portion fixed to the fixed body-side fixing part, and wherein the reinforcement plate is located between the flexible printed circuit and the movable body-side fixing part, and/or wherein the reinforcement plate is located between the flexible printed circuit and the fixed body-side fixing part.

15. The optical unit according to claim 4, wherein
the flexible printed circuit includes a reinforcement plate in at least one of a portion fixed to the movable body-side fixing part and a portion fixed to the fixed body-side fixing part, and wherein the reinforcement plate is located on a side of the flexible printed circuit opposite with a side where the movable body-side fixing part is located, and/or wherein the reinforcement plate is located on a side of the flexible printed circuit opposite with a side where the fixed body-side fixing part is located.

16. The optical unit according to claim 4, wherein
a rolling direction centers around the optical axis, and
the optical module has a mechanism for correcting shake in a pitching direction and a yawing direction.

17. The optical unit according to claim 4, wherein
the first portion of the flexible printed circuit extending in the first direction and the second portion of the flexible printed circuit extending in the second direction are connected together as to intersect at an angle of 90° or more.

18. The optical unit according to claim 4, wherein
a bend in a form of bellows is provided on the first portion of the flexible printed circuit extending in the first direction.

* * * * *